United States Patent [19]
Lippincott et al.

[11] Patent Number: 5,345,554
[45] Date of Patent: Sep. 6, 1994

[54] VISUAL FRAME BUFFER ARCHITECTURE

[75] Inventors: Louis A. Lippincott, Roebling, N.J.; Serge Rutman, Boulder Creek, Calif.

[73] Assignee: Intel Corporation, Santa Clara, Calif.

[21] Appl. No.: 901,434

[22] Filed: Jun. 19, 1992

Related U.S. Application Data

[63] Continuation-in-part of Ser. No. 870,564, Apr. 17, 1992.

[51] Int. Cl.⁵ .............................................. G06F 15/20
[52] U.S. Cl. .................................... 395/162; 395/164
[58] Field of Search ............... 395/135, 148, 153, 162, 395/164, 165, 166; 340/750, 798–800; 345/185, 196, 201, 203, 132, 133, 149

[56] References Cited

U.S. PATENT DOCUMENTS

| | | | |
|---|---|---|---|
| 4,494,144 | 1/1985 | Brown | 318/133 |
| 4,737,916 | 4/1988 | Ogawa et al. | 395/135 |
| 4,791,112 | 2/1988 | Callemyn | 395/166 |
| 4,979,130 | 12/1990 | Li et al. | 395/135 |
| 4,991,110 | 2/1991 | Hannah | 340/750 |
| 5,151,975 | 9/1992 | Shiraki et al. | 395/153 |
| 5,179,639 | 1/1993 | Taaffe | 395/135 |

*Primary Examiner*—Dale M. Shaw
*Assistant Examiner*—Kee M. Tung
*Attorney, Agent, or Firm*—Carl L. Silverman; William H. Murray; James H. Dautremont

[57] ABSTRACT

An apparatus for processing visual data includes a first video random access memory (VRAM) for storing a first bit plane of visual data in a first format. A graphics controller is coupled to the first VRAM by a data bus and a storage bus. The apparatus is capable of receiving at least a second VRAM for storing at least a second bit plane of visual data in at least a second format different from the first format. The received VRAMs are coupled to the graphics controller by data and storage busses. The visual data stored on the VRAMs are merged into a pixel stream which is then converted to analog form by a digital to analog converter. Data transfer addresses are generated for each of the VRAMs simultaneously, sequentially or in overlapping timed relationship.

9 Claims, 4 Drawing Sheets

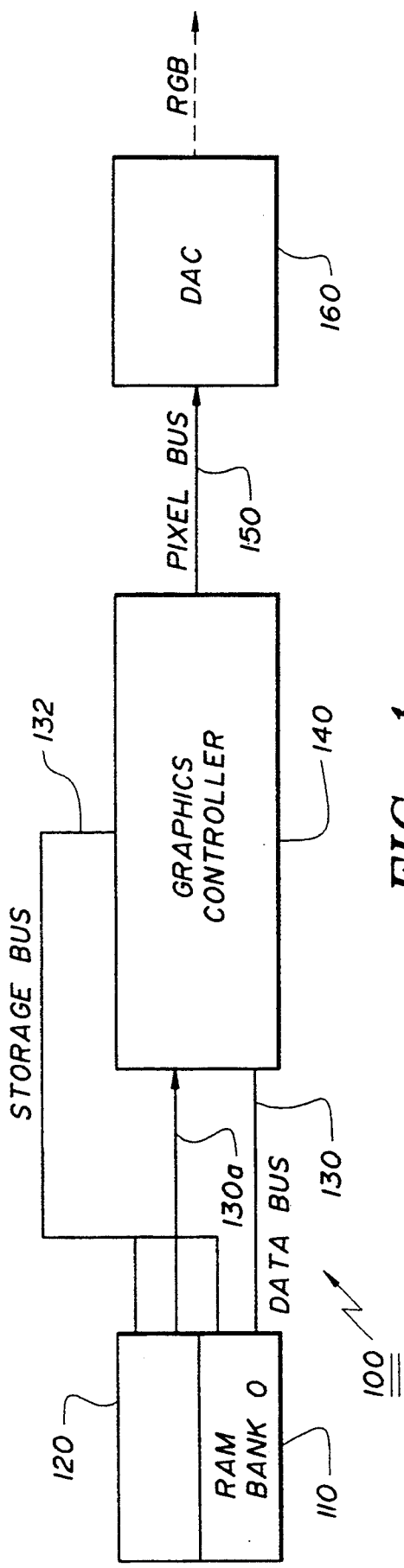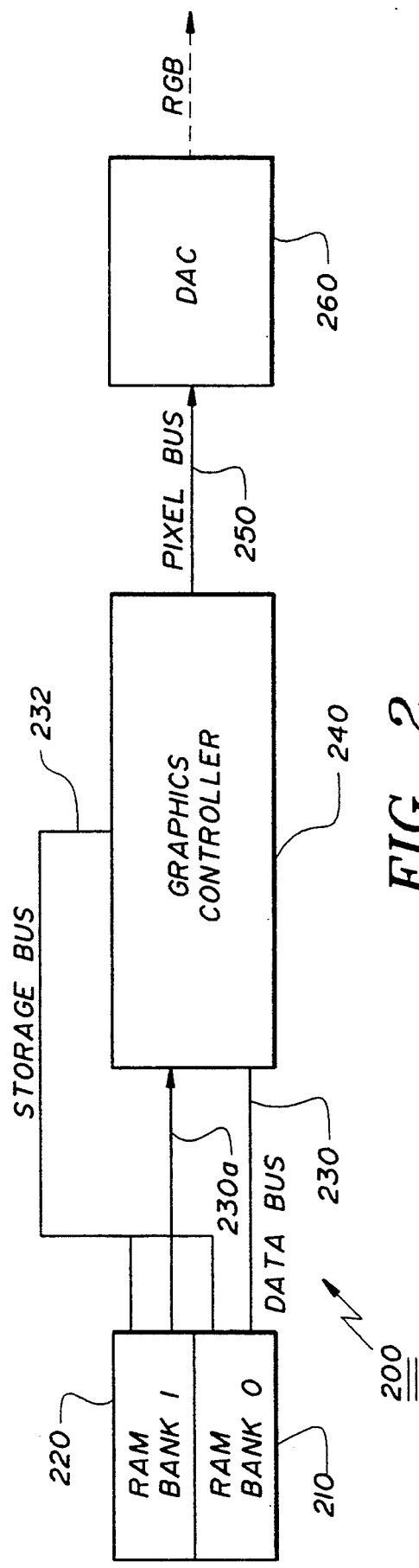

VISUAL FRAME BUFFER ARCHITECTURE

CROSS REFERENCE TO RELATED APPLICATIONS

This is a continuation-in-part of U.S. patent application Ser. No. 07/870,564 filed Apr. 17, 1992, entitled Visual Frame Buffer Architecture.

FIELD OF THE INVENTION

This invention relates to video signal processing generally and particularly to systems for providing a digital signal representative of video and graphics information.

BACKGROUND OF THE INVENTION

The goal of attaining an integrated video/graphics system requires a system architect to balance often conflicting requirements of video subsystems and graphics subsystems. For example, while increasing horizontal and vertical resolution is beneficial to graphics images, in digital video subsystems increasing horizontal and vertical resolution can actually be detrimental to the overall image quality. Likewise, in graphics subsystems, the pixel depth, i.e. the number of simultaneous colors available, is not as important as it is for video systems. While it may be hard to justify the additional system cost of 16 bit, near-true-color pixels for the graphics system, a video system can arguably make use of deeper 24 bit pixels.

The performance budget of a video processor in a digital video subsystem during playback is divided and used to perform two tasks: creating the video image from a compressed data stream and copying/scaling the image to the display buffer. The performance budget of the video subsystem must be balanced between the copy/scale operation and the video decompression operation. Both operations should be performed thirty times a second for smooth, natural motion video. The division of the performance budget is usually done to worse case which results in an allocation of sufficient performance for a full screen motion video copy/scale operation with the remaining performance being dedicated to the video decompression operation. If the number of pixels (and/or bytes) that have to be written in the copy/scale operation are increased, the performance of the video decompression necessarily decreases. In ever increasing resolutions, for a given level of video technology, a point will be reached where the video image starts to degrade because the information content in the decompressed image is too low. Increasing the resolution beyond this point would be analogous to playing back a poor copy of a VHS tape on the most expensive, highest-quality TV available; the TV would reproduce the low-quality images perfectly.

Several formats have been presented for storing pixel data in a video subsystem. One approach is to simply have 24 bits of RGB information per pixel. This approach yields the maximum color space required for video at the expense of three bytes per pixel. Depending on the number of pixels in the video subsystem, the copy/scale operation could be overburdened.

A second approach is a compromise of the 24 bit system and is based on 16 bits of RGB information per pixel. Such systems have less bytes for the copy/scale operation but also have less color depth. Additionally, since the intensity and color information are encoded equally in the R, G and B components of the pixel, the approach does not take advantage of the human eye's sensitivity to intensity and insensitivity to color saturation. Other 16 bit systems have been proposed that encode the pixels in a YUV format such as 6, 5, 5 and 8, 4, 4. Although somewhat better than 16 bit RGB, the 16 bit YUV format does not come close to the performance of 24 bit systems.

The 8 bit CLUT provides a third approach. This method uses 8 bits per pixel as an index into a color map that typically has 24 bits of color space as the entry. This approach has the advantages of low byte count and 24 bit color space. However, since there are only 256 colors available on the screen, image quality suffers. Techniques that use adjacent pixels to "create" other colors have been demonstrated to have excellent image quality, even for still images. However, this dithering technique often requires complicated algorithms and "custom" palette entries in the DAC as well as almost exclusive use of the CLUT. The overhead of running the dithering algorithm must be added to the copy/scale operation.

One approach for storing pixel data in a video subsystem has been to represent the intensity information with more bits than is used to represent the color saturation information. The color information is subsampled in memory and interpolated up to 24 bits per pixel by the display controller as the information is being displayed. This technique has the advantage of full color space while maintaining a low number of bits per pixel. All of the pixel depth/density tradeoffs are made in the color saturation domain where the effects are less noticeable.

Motion video can be displayed in a 4:1:1 format called the "9 bit format". The 4:1:1 means there are 4 Y samples horizontally for each UV sample and 4 Y samples vertically for each UV sample. If each sample is 8 bits then a 4×4 block of pixels uses 18 bytes of information or 9 bits per pixel. Although image quality is quite good for motion video the 9 bit format may be deemed unacceptable for display of high-quality stills. In addition, it was found that the 9 bit format does not integrate well with graphics subsystems. Other variations of the YUV subsampled approach include an 8 bit format.

As noted above, the requirements for a graphics system include high horizontal and vertical resolution with shallow pixels. A graphics system in which the display was 1280×1024 with 8 bit clut pixels would likely meet the needs of all but the most demanding applications. In contrast, the requirements for the video system include the ability to generate 24 bit true color pixels with a minimum of bytes in the display buffer. A video system in which the display was 640×512×8 bit (YUV interpolated to 24 bits and upsampled to 1280×1024) would also meet the needs of most applications.

Systems integrating a graphics subsystem display buffer with a video subsystem display buffer generally fall into two categories. The two types of approaches are known as Single Frame Buffer Architectures and Dual Frame Buffer Architectures.

The Single Frame Buffer Architecture (SFBA) approach consists of a single graphics controller, a single digital to analog converter (DAC) and a single frame buffer. In its simplest form, the SFBA has each pixel on the display represented by bits in the display buffer that are consistent in their format regardless of the meaning of the pixel on the display. In other words, graphics pixels and video pixels are indistinguishable in the frame buffer RAM. An integrated SFBA graphics/video subsystem does not address the requirements of the video subsystem very well.

Full screen motion video on an SFBA graphics/video subsystem requires updating every pixel in the display buffer preferably 30 times a second. Assuming the size of the display buffer is on the order of 1280×1024 by 8 bits, the rate required for updating every pixel in the display buffer 30 times per second is 1280×1024×30 or over 30 Mbytes per second. Even without the burden of writing over 30 Mbytes per second to the display buffer, it has been established that 8 bit video by itself does not provide the required video quality. This means the SFBA system can either move up to 16 bits per pixel or implement the 8 bit YUV subsampled technique. Since 16 bits per pixel will yield over 60 Mbytes per second into the frame buffer, it is clearly an unacceptable alternative.

A high quality visual system must be able to mix video and graphics together on a display which requires the display to show on occasion a single video pixel located in between graphics pixels. Because of the need to mix video and graphics there is a hard and fast rule dictating that every pixel in the display buffer be a stand-alone, self-sustaining pixel on the screen. The very nature of the 8 bit YUV subsampled technique makes it necessary to have several 8 bit samples before one video pixel can be generated, making the technique unsuitable for the SFBA visual system.

The second category of architectures integrating video and graphics is the Dual Frame Buffer Architecture (DFBA). The DFBA visual system involves mixing two otherwise free-standing single frame buffer systems at the analog back end with a high-speed analog switch. Since the video and graphics subsystems are both single frame buffer designs each one can make the necessary tradeoffs in spatial resolution and pixel depth with almost complete disregard for the other subsystem. DFBA visual systems also include the feature of being loosely-coupled. Since the only connection of the two systems is in the final output stage, the two subsystems can be on different buses in the system. The fact that the DFBA video subsystem is loosely-coupled to the graphics subsystem is usually the overriding reason such systems, which have significant disadvantages, are typically employed.

DFBA designs typically operate in a mode that has the video subsystem genlocked to the graphics subsystem. Genlocked in this case means having both subsystems start to display their first pixel at the same time. If both subsystems are running at exactly the same horizontal line frequency with the same number of lines, then mixing of the two separate video streams can be done with very predictable results. Since both pixel streams are running at the same time, the process can be thought of as having video pixels underlaying the graphics pixels. If a determination is made not to show a graphics pixel, then the video information will show through. In DFBA designs, it is not necessary for the two subsystems to have the same number of horizontal pixels. As an example, it is quite possible to have 352 video pixels underneath 1024 graphics pixels.

The decision whether to show the video information or the graphics information in DFBA visual systems is typically made on a pixel by pixel basis in the graphics subsystem. A technique often used is called "chroma keying". Chroma keying involves detecting a specific color (or color entry in the CLUT) in the graphics digital pixel stream. Another approach referred to as "black detect", uses the graphics analog pixel stream to detect black, since black is the easiest graphics level to detect. In either case, keying information is used to control the high-speed analog switch and the task of integrating video and graphics on the display is reduced to painting the keying color in the graphics display where video pixels are desired.

There are several disadvantages to DFBA visual systems. The goal of high-integration is often thwarted by the need to have two separate, free-standing subsystems. The cost of having duplicate DACs, display buffers, and CRT controllers is undesirable. The difficulty of genlocking and the cost of the high-speed analog switch are two more disadvantages. In addition, placing the analog switch in the graphics path will have detrimental effects on the quality of the graphics display. This becomes an ever increasing problem as the spatial resolution and/or line rate of the graphics subsystem grows.

It is an object of the present invention to provide an integrated system for storing and displaying graphics and video information.

It is further object of the present invention to provide a system for storing and displaying either graphics or video information, which system can be easily upgraded into an integrated system for storing and displaying graphics and video information by merely augmenting the system with additional memory.

It is another object of the present invention to provide an integrated system for storing and displaying visual information in which different data transfer addresses can be generated to access different types of visual data.

Further objects and advantages of the invention will become apparent from the description of the invention which follows.

SUMMARY OF THE INVENTION

In one embodiment of the present invention, an apparatus visual data comprises a first storage means for storing a first bit plane of visual data in a first format. A graphics controller is coupled to the first storage means by a data bus and a storage bus. Means for receiving at least one additional storage means for storing at least one additional bit plane of visual data in at least one additional format different from the first format is also provided. The receiving means is adapted to couple the storage means to the graphics controller by a data bus and the storage bus. The invention also includes means for forming a merged pixel stream from visual data stored in the first storage means and visual data stored in each additional storage means. Means, coupled to the graphics controller, are provided for generating an analog signal representative of the merged pixel stream.

In another embodiment of the present invention, an apparatus for processing visual data comprises a first storage means for storing a first bit plane of visual data in a first format. A graphics controller is coupled to the first storage means by a data bus and a storage bus. At least one additional storage means for storing at least one additional bit plane of visual data in at least one additional format different from said first format is also provided. Each additional storage means is coupled to the graphics controller by a data bus and the storage bus. Means for forming a merged pixel stream from visual data stored in the first storage means and visual data stored in each additional storage means are also included. Means, coupled to the graphics controller, are provided for generating an analog signal representative of the merged pixel stream.

In a further embodiment of the present invention, the apparatus for processing visual data additionally comprises means for generating, at a predetermined time, at least one type of data transfer address for each of the storage means.

BRIEF DESCRIPTION OF THE DRAWINGS

FIG. 1 is a block diagram illustrating the operation of a first preferred embodiment of the present invention.

FIG. 2 is a block diagram illustrating the operation of a second preferred embodiment of the present invention.

DETAILED DESCRIPTION OF THE PREFERRED EMBODIMENT

Figure 3:
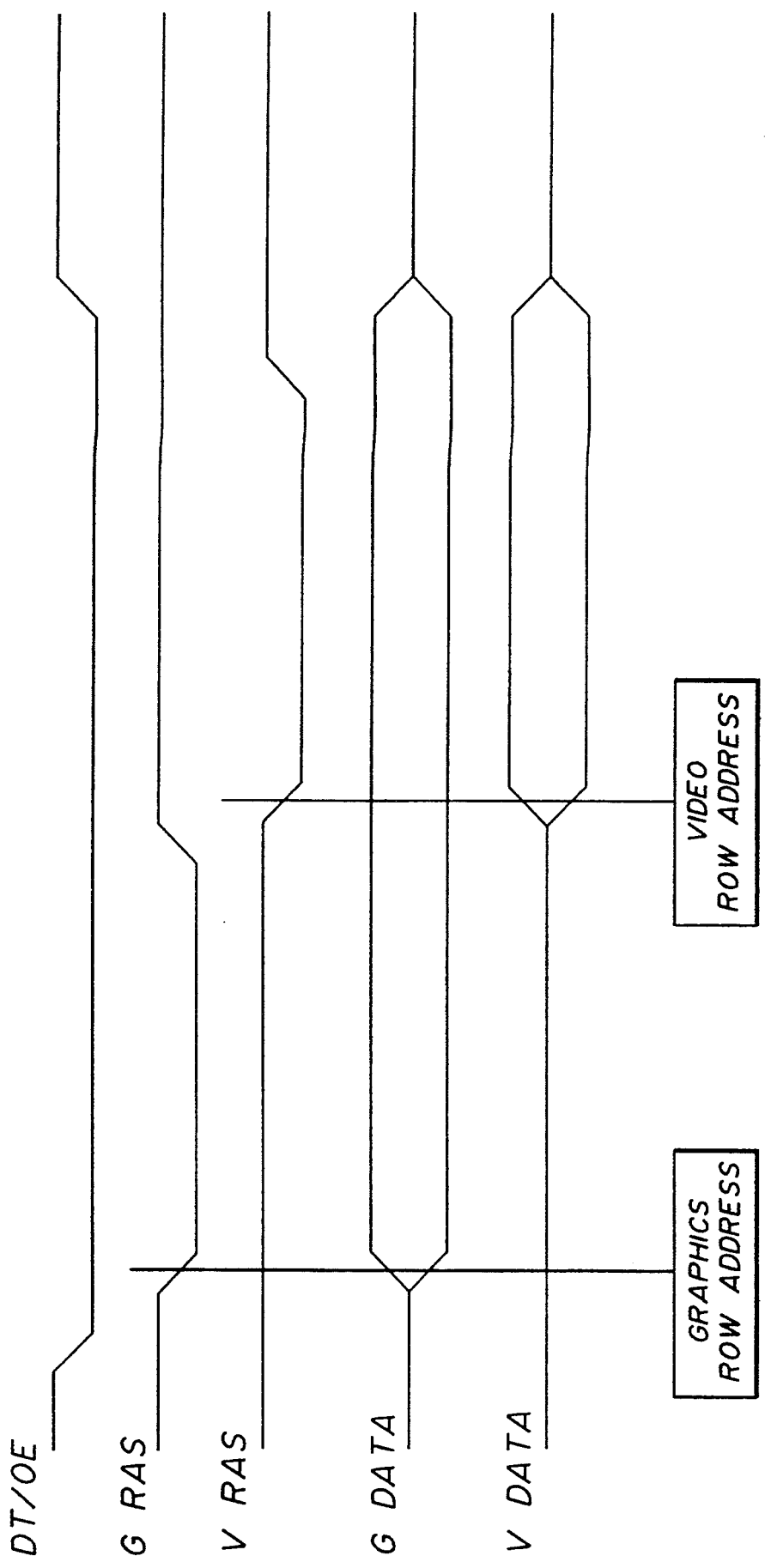
FIG. 3 is a timing diagram illustrating a preferred embodiment for generating different data transfer addresses for two banks of memory storing different types of visual data in accordance with the present invention.

Referring now to FIG. 1, there is shown a block diagram illustrating the operation of an apparatus, designated generally 100, for processing visual data according to a first preferred embodiment of the present invention. The invention shown includes first storage means 110 for storing a first bit plane of visual data in a first format. First storage means 110 is preferably a video random access memory (VRAM). A VRAM is a dual-ported random access memory as is known in the art. Such a VRAM is, for example, a Toshiba MOS Memory Products type TC524256P/Z/J CMOS multiport memory equipped with a random access memory (RAM) port and a serial access memory (SAM) port. The operation of this exemplary VRAM is described in the specification for the Toshiba MOS Memory Products TC524256P/Z/J-10, TC524256P/Z/J-12 specification sheet, which specification sheet is incorporated by reference into this detailed description as if fully set forth herein.

First storage means 110 is coupled to graphics controller 140 through storage bus 132, which is also well-known in the art by the term "RAM bus". First storage means 110 and graphics controller 140 are also coupled by data bus 130, which is also well-known in the art by the term "SAM bus". The data bus 130 is preferably coupled to the serial access memory (SAM) port of the VRAM first storage means 110. Control and address signals are preferably provided to the VRAM through the storage bus 132.

The invention also includes means 120 for receiving a second storage means for storing a second bit plane of visual data in a second format different from the first format. Means 120 is adapted to couple a second storage means to graphics controller 140 through the storage bus 132. Means 120 is also adapted to couple the second storage means to graphics controller 140 by data bus 130a. In the preferred embodiment the second storage means is also a VRAM. Graphics controller 140 includes means for forming a merged pixel stream from visual data stored on said first and second storage means.

Means 160 for converting the digital information in the merged pixel stream to analog form is also provided. Means 160 preferably comprises a digital to analog converter (DAC) for driving a video monitor. Means 160 is coupled to graphics controller 140 by pixel bus 150. In the preferred embodiment, data bus 130 and data bus 130a are separate 8 bit buses. In an alternative embodiment, a single 16 bit data bus may be used to couple both first storage means 110 and a second storage means to graphics controller 140. Data buses of other widths may also be used.

FIG. 1 shows a base configuration of the present invention in which first storage means 110 is represented by VRAM BANK 0. This base configuration may operate in an 8-bit CLUT mode. This mode allows operation of VRAM BANK 0 as a Single Frame Buffer Architecture (SFBA), similar to a VGA or XGA system in 8 bits per pixel mode. The 8-bit CLUT mode also allows for operation of the base configuration as a video subsystem using software video subsystem functions operating in the 8-bit CLUT mode hardware environment as is known in the art. The base configuration may also operate as a SFBA system with limited graphics/video integration (8 bits/pixel) as described in the Background section above. In the 8-bit CLUT mode, the bandwidth of data bus 130 is the same as would be required for a stand alone 8 bit CLUT graphics subsystem.

Means 120 for receiving a second storage means allows the base configuration of the present invention to be easily upgraded by the mere addition of a second storage means, preferably a second VRAM as previously described, to operate either as (i) an integrated system for storing and displaying both graphics and video information ("the Dual Color Space Mode"), or as (ii) an expanded single frame buffer for storing and displaying either graphics only or video only information at a deepened pixel depth and/or increased resolution level ("the Expanded Single Frame Buffer Mode").

In the Dual Color Space Mode, a first type of visual data may be stored in first storage means 110 in a first format, and a second type of visual data may be stored in a second storage means in a second format which is different from the first format. For example, graphics data may be stored in first storage means 110 in RGB format, and video data may be stored in the second storage means in YUV format. In the Expanded Single Frame Buffer Mode, first storage means 110 and a second storage means preferably provide for operation of the system as a video only system or a graphics only subsystem with 16 bits per pixel. The Expanded Single Frame Buffer Mode may also operate as a SFBA system with limited graphics/video integration (16 bits/pixel) as described in the Background section above.

Graphics controller 140 includes means for forming a merged pixel stream from data in a first format stored on storage means 110 and data which may be stored in a second format on a second storage means, once a second storage means is received by means 120. According to a preferred embodiment, when the base system is upgraded (e.g., when a second storage means is received by means 120) and operating in the Dual Color Space Mode, graphics data is stored in one of the storage means in 8-bit CLUT format, and video data is stored in the other storage means as 8 bit YUV data. The preferred format of the 8 bit YUV data in the Dual Color Space Mode is shown in Table I below, with each position being a single byte:

TABLE I $Y_a U_a Y_b V_a Y_c U_b Y_d V_b Y_e U_c \ldots$

In the Dual Color Space Mode, a first pixel stream representing the RGB graphics pixels ($GP_n$) is processed in parallel with a second pixel stream representing YUV video pixels ($VP_n$). The two parallel pixel streams are stored in parallel in accordance with the format shown in Table II below:

TABLE II

| $GP_1$ | $GP_2$ | $GP_3$ | $GP_4$ | $GP_5$ | $GP_6$ | $GP_7$ | $GP_8$ | $GP_9$ | ... |
|---|---|---|---|---|---|---|---|---|---|
| $Y_a$ | $U_a$ | $Y_b$ | $V_a$ | $Y_c$ | $U_b$ | $Y_d$ | $V_b$ | $Y_e$ | ... |

The pixels generated by the video subsystem ($VP_n$) in the Dual Color Space Mode are preferably 24 bit RGB values derived from 24 bit YUV pixels. The 24 bit YUV pixels are determined for each video pixel $VP_n$ in accordance with the formula shown in Table III below:

TABLE III $Y = Y_a$, $U = U_a$, and $V = V_a$ for $VP_1$;
$Y = .5Y_a + .5Y_b$, $U = .75U_a + .25U_b$, and $V = .75V_a + .25V_b$ for $VP_2$;
$Y = Y_b$, $U = .5U_a + .5U_b$, and $V = .5V_a + .5V_b$ for $VP_3$;
$Y = .5Y_b + .5Y_c$, $U = .25U_a + .75U_b$, and $V = .25V_a + .75V_b$ for $VP_4$
$Y = Y_c$, $U = U_b$, and $V = V_b$ for $VP_5$, and so on.

Other subsampling techniques may be used to build the RGB values.

In the preferred embodiment, chroma keying is preferably used on the graphics pixel stream to determine whether to show a graphics pixel or a video pixel. In the example of Table II, if $GP_3$ and $GP_4$ held pixel values equal to the chroma key value, then the merged graphics and video pixel stream (the visual pixel stream) provided to the DAC would have the format shown in Table IV below:

TABLE IV $GP_1$ $GP_2$ $VP_3$ $VP_4$ $GP_5$ $GP_6$ $GP_7$ $GP_8$ $GP_9 \ldots$

Referring now to FIG. 2, there is shown a block diagram illustrating the operation of an apparatus, designated generally 200, for processing visual data according to a second preferred embodiment of the present invention. The invention shown includes first storage means 210 for storing a first bit plane of visual data in a first format. First storage means 210 is coupled to graphics controller 240 through storage bus 232. First storage means 210 and graphics controller 240 are also coupled by data bus 230. The invention also includes second storage means 220 for storing a second bit plane of visual data in a second format different from the first format. Second storage means 220 is coupled to graphics controller 240 through storage bus 232. Second storage means 220 and graphics controller 240 are also coupled by data bus 230a.

Graphics controller 240 includes means for forming a merged pixel stream from visual data stored on said first and second storage means. Means 260 for displaying the merged pixel stream is also provided. Means 260 is coupled to graphics controller 240 by pixel bus 250. In the preferred embodiment, data bus 230 and data bus 230a are separate eight bit buses. In an alternative embodiment, a single 16 bit data bus may be used to couple both first storage means 210 and second storage means 220 to graphics controller 240. Data buses of other widths may also be used. Apparatus 200 functions substantially in accordance with apparatus 100, with a second storage means having been received by means 120. Apparatus 200 is thus configured to operate either in the Dual Color Space or the Expanded Single Frame Buffer Modes described above.

Although the preferred embodiment of the present invention previously described incorporates the use of two 8-bit VRAM's, the scope of the invention is not so limited. A single VRAM with means for accepting multiple additional VRAMs is also possible. It is also not necessary that all of the VRAMs have the same pixel depth. For example, the VRAM BANK 0 might be an 8-bit VRAM with VRAM BANK 1 comprising two 8-bit VRAM's or a single 16-bit VRAM for storing 16-bit per pixel video data with the VRAM BANK 0 storing 8-bits per pixel graphics data.

If the graphics pixels are 8-bits and the video pixels are 16-bits the scheme of using the same data transfer addresses for both video and graphics banks of VRAM does not work since the pitch of the graphics and the video bit map is no longer the same. For example, in systems incorporating separate buffers for video and graphics information, it is not necessary for the two subsystems to have the same number of horizontal pixels. For example, it is possible, as previously stated to have a system in which the video utilizes 352 video pixels per line and the graphics utilizes 1024 pixels per line. In order to efficiently utilize memory, video pixel data will not necessarily be stored in memory locations which have a one for one correspondence with the memory locations for graphics pixel data. This requires different data transfer addresses to be generated for the VRAM BANK storing graphics data and the VRAM BANK storing the video data.

One way of generating different data transfer addresses for VRAM BANKs storing different types of visual data such as graphics data and video data is depicted in FIG. 3. FIG. 3 is a timing diagram depicting a preferred implementation for the generation of data transfer addresses for video and graphics data stored in VRAM BANK 0 and VRAM BANK 1. This implementation requires the addition of a second row address strobe (RAS) signal generated by the graphics controller 140; and the generation of two data transfer (DT) cycles preferably during the horizontal blanking interval, one being targeted at the graphics data storage means and the other at the video data storage means.

In the VRAM of the preferred embodiment, a read-transfer consists of loading a selected row of data from the random access memory (RAM) array of the VRAM into the serial address memory (SAM) register. A read-transfer is accomplished by holding the data transfer-/output enable (DT/OE) signal low at the falling edge of the row address strobe (RAS) strobe signal. The row address selected at the falling edge of the RAS signal determines the RAM row to be transferred into the SAM. The actual data transfer is completed at the rising edge of the DT/OE signal. When the data transfer is completed, the serial input output (SIO) lines of the VRAM are set into the output mode.

The start address of the serial pointer of the SAM is determined by the column address selected at the falling edge at the column address strobe (CAS) signal. In FIG. 3, GRAS refers to the RAS signal applied to the graphics VRAM; VRAS refers to the RAS signal applied to the video storage means; G DATA refers to graphics data transferred from the RAM array into the SAM register; and V DATA refers to the video data transferred from the RAM array into the SAM register.

Figure 4:
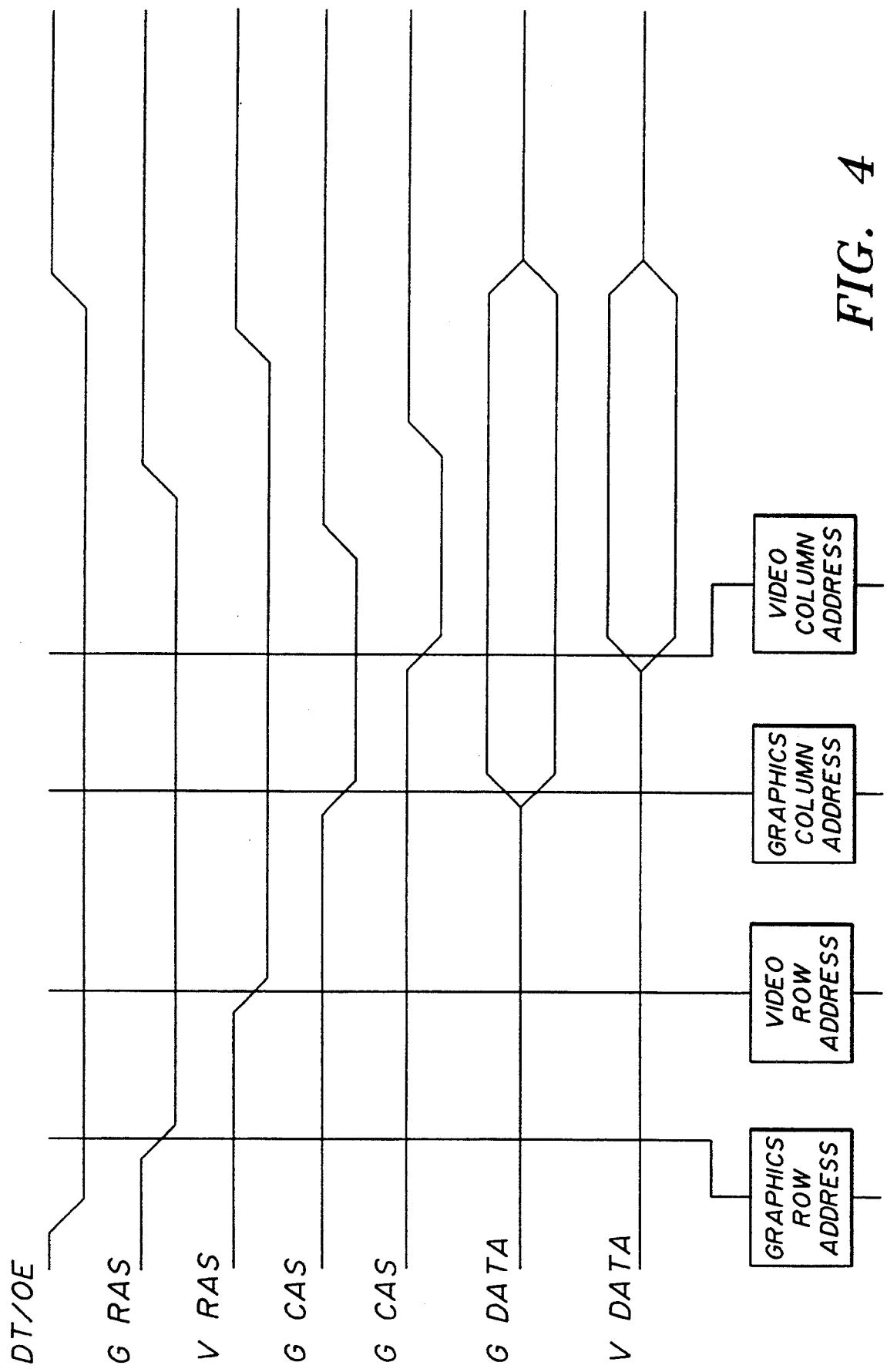
FIG. 4 is a timing diagram illustrating an alternate preferred embodiment for generating different data transfer addresses for two banks of memory storing different types of visual data in accordance with the present invention.

Another way of generating different data transfer addresses for VRAM BANK's storing different types of visual data such as graphics data and video data is depicted in FIG. 4. This implementation requires the addition of a second RAS signal generated by the graphics controller 140; a second column address strobe (CAS) signal generated by the graphics controller 140; which generates a single "stretched" DT cycle with the addresses for graphics and video, as well as the RAS signals being staggered. The time to complete both transfers is shorter than that of the implementation depicted in FIG. 3 however it requires more extra pins, one for the RAS signal and one for the CAS signal per frame buffer.

Figure 5:
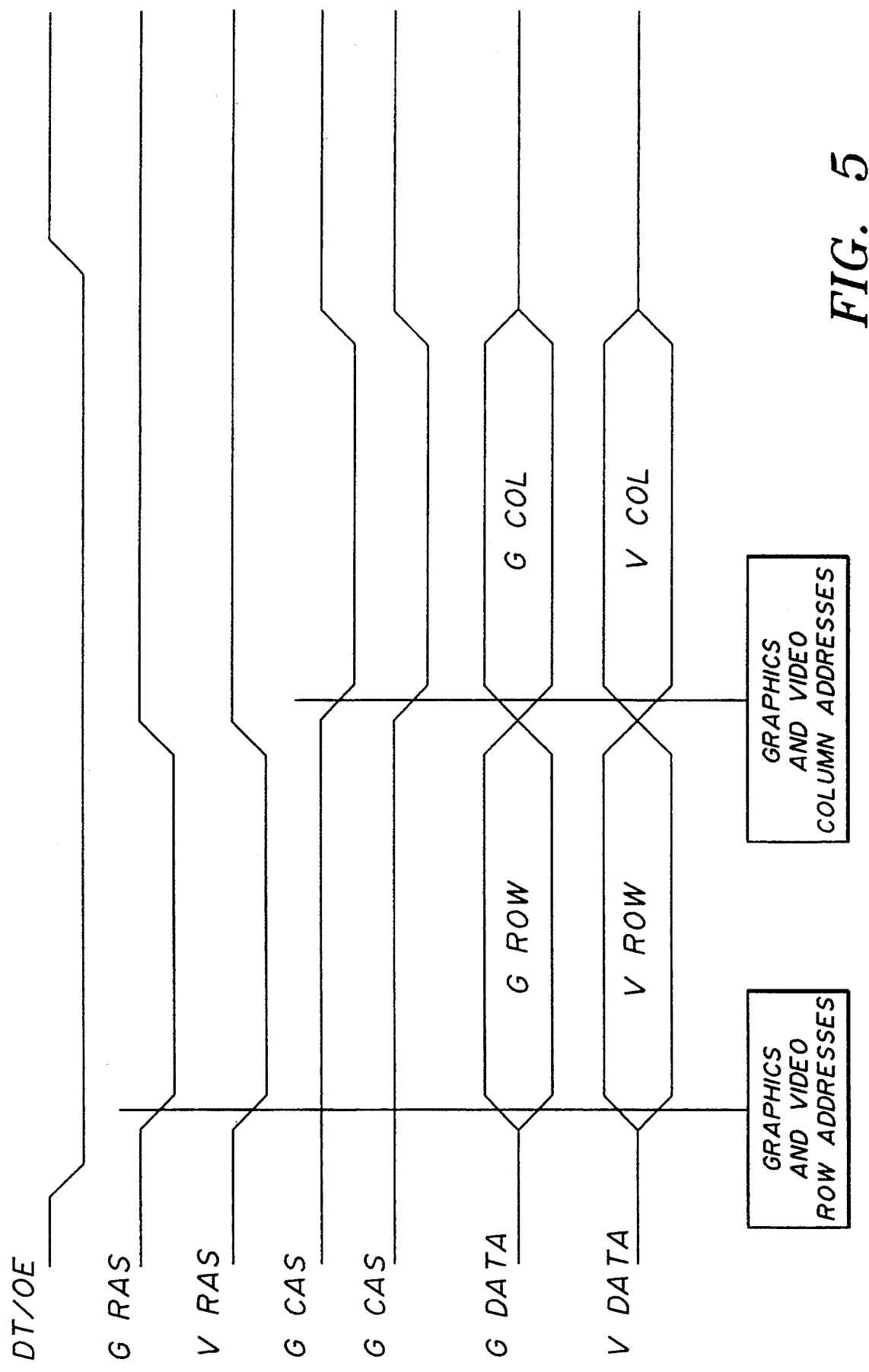
FIG. 5 is a timing diagram illustrating yet another alternate preferred embodiment for generating different data transfer addresses for two banks of memory storing different types of visual data in accordance with the present invention.

Yet another way of generating different data transfer addresses for VRAM BANK's storing different types of visual data such as graphics data and video data is depicted in FIG. 5. This implementation requires the addition of a second RAS signal generated by the graphics controller 140 and a second VRAM address bus which generates the DT cycles targeted at video and graphics VRAM at exactly the same time. This requires the shortest time to complete both transfers but requires the most extra pins, one RAS, one CAS and one ADDRESS bus which totals nine to ten pins for current generation VRAMs.

When the control function for all the frame buffers is combined in one controller, it is desirable to perform the data transfer cycles for screen refresh in the most expedient manner, allowing as much of the VRAM bandwidth for functions other than screen refresh. Such other functions might include drawing operations or video frame updates. Performing the screen-refresh related functions at the same time increases "useful" utilization of the frame stores. While it is preferable that the data transfer functions be performed during horizontal retrace to simplify frame buffer design or use simpler VRAMs, this places a further limit on the time available for performing screen-refresh related functions.

The first two ways of generating different data transfer addresses described above allow the memory controller to add support for extra frame buffers with a minimum of added pins. The second and third ways of generating different data transfer addresses described above reduce the time required to perform the screen refresh related VRAM cycles. They also simplify/permit higher integration of the graphics controller by requiring only one scheduling, arbitration event related to performing data transfer cycles for screen refresh in multiple frame buffers.

The ways of generating different data transfer addresses described above are particularly useful in connection with an encoding of graphics and/or video data that requires a different number of bits to represent a pixels worth of data in each frame store as also described above. Such enable a system integrator of a visual frame buffer architecture of the present invention, a dual frame buffer or multiple frame buffer to make trade offs in storage requirements between "graphics" data types (color look up table entries or RGB values) and "video" data types (YUV or YCrCb sequences, possibly with some or all of the components subsampled).

As can be seen from the above detailed description, the visual frame buffer architecture of the present invention is a scaleable architecture that allows several levels of performance. With just the addition of VRAM BANK 1 (which provides the dual color space mode) to the base architecture, software only decode programs will be able to provide a significant increase in performance and front-of-screen quality. The next step in the upgrade path would be the addition of a video accelerator. An inexpensive, limited-function video accelerator would provide a significant improvement in performance over the software only approach. In addition of a high performance video accelerator would provide a further significant improvement in performance over the addition of a limited-video accelerator.

The present invention may be embodied in other specific forms without departing from the spirit or essential attributes of the invention. Accordingly, reference should be made to the appended claims, rather than the foregoing specification, as indicating the scope of the invention.

What is claimed is:

1. An apparatus for integrating a graphics subsystem display buffer with a video subsystem display buffer comprising:
   (A) first storage means for storing a first bit plane of graphics data in a first format;
   (B) a graphics controller coupled to said first storage means by a data bus and a storage bus;
   (C) a second storage means for storing a second bit plane of video data in a second format different from said first format, said second storage means being coupled to said graphics controller by a data bus and a storage bus;
   (D) means employing chroma keying for forming a merged pixel stream from said graphics data stored on said first storage means and said video data stored on said second storage means, wherein said graphics data and said video data represent images stored at different spatial resolutions;
   (E) means for generating data transfer addresses of the same type for each of said storage means contemporaneously; and
   (F) means, coupled to said graphics controller, for generating an analog signal representative of said merged pixel stream.

2. An apparatus for integrating a graphics subsystem display buffer with a video subsystem display buffer comprising:
   (A) first storage means for storing a first bit plane of graphics data in a first format;
   (B) a graphics controller coupled to said first storage means by a data bus and a storage bus;
   (C) a second storage means for storing a second bit plane of video data in a second format different from said first format, said second storage means being coupled to said graphics controller by a data bus and a storage bus;
   (D) means employing chroma keying for forming a merged pixel stream from said graphics data stored on said first storage means and said video data stored on said second storage means, wherein said graphics data and said video data represent images stored at different spatial resolutions;

(E) means for generating data transfer addresses of the same type for each of said storage means sequentially; and (F) means, coupled to said graphics controller, for generating an analog signal representative of said merged pixel stream.

3. An apparatus for integrating a graphics subsystem display buffer with a video subsystem display buffer comprising:

(A) first storage means for storing a first bit plane of graphics data in a first format;

(B) a graphics controller coupled to said first storage means by a data bus and a storage bus;

(C) a second storage means for storing a second bit plane of video data in a second format different from said first format said second storage means being coupled to said graphics controller by a data bus and a storage bus;

(D) means employing chroma keying for forming a merged pixel stream from said graphics data stored on said first storage means and said video data stored on said second storage means, wherein said graphics data and said video data represent images stored at different spatial resolutions;

(E) means for generating data transfer addresses of the same type for each of said storage means in overlapping time relationship; and (F) means, coupled to said graphics controller, for generating an analog signal representative of said merged pixel stream.

4. An apparatus for integrating a graphics subsystem display buffer with a video subsystem display buffer comprising:

(A) first storage means for storing a first bit plane of video data in a first format;

(B) a graphics controller coupled to said first storage means by a data bus and a storage bus;

(C) at least one additional storage means for storing at least one additional bit plane of graphics data in at least one additional format different form said first format, each of said at least one additional storage means being coupled to said graphics controller by a data bus and a storage bus;

(D) means for forming a merged pixel stream from said video data stored on said first storage means and said graphics data stored on said at least one additional storage means, wherein said graphics data and said video data represent images stored at equivalent spatial resolutions;

(E) means for generating data transfer addresses of different types for each of said storage means at substantially the same time; and (F) means, coupled to said graphics controller, for generating an analog signal representative of said merged pixel stream.

5. An apparatus for integrating a graphics subsystem display buffer with a video subsystem display buffer comprising:

(A) first storage means for storing a first bit plane of video data in a first format;

(B) a graphics controller coupled to said first storage means by a data bus and a storage bus;

(C) at least one additional storage means for storing at least one additional bit plane of graphics data in at least one additional format different from said first format, each of said at least one additional storage means being coupled to said graphics controller by a data bus and a storage bus;

(D) means for forming a merged pixel stream from said video data stored on said first storage means and said graphics data stored on said at least one additional storage means, wherein said graphics data and said video data represent images stored at equivalent spatial resolutions;

(E) means for generating data transfer addresses of different types for each of said storage means sequentially; and (F) means, coupled to said graphics controller, for generating an analog signal representative of said merged pixel stream.

6. An apparatus for integrating a graphics subsystem display buffer with a video subsystem display buffer comprising;

(A) first storage means for storing a first bit plane of video data in a first format;

(B) a graphics controller coupled to said first storage means by a data bus and a storage bus;

(C) at least one additional storage means for storing at least one additional bit plane of graphics data in at least one additional format different from said first format, each of said at least one additional storage means being coupled to said graphics controller by a data bus and a storage bus;

(D) means for forming a merged pixel stream from said video data stored on said first storage means and said graphics data stored on said at least one additional storage means, wherein said graphics data and said video data represent images stored at equivalent spatial resolutions;

(E) means for generating data transfer addresses of different types for each of said storage means in overlapping time relationship; and (F) means, coupled to said graphics controller, for generating an analog signal representative of said merged pixel stream.

7. An apparatus for integrating a graphics subsystem display buffer with a video subsystem display buffer comprising:

(A) first storage means for storing a first bit plane of video data in a first format;

(B) a graphics controller coupled to said first storage means by a data bus and a storage bus;

(C) means for receiving at least one additional storage means for storing at least one additional bit plane of graphics data in at least one additional format different from said first format, each of said at least one additional storage means being coupled to said graphics controller by a data bus and a storage bus;

(D) means for forming a merged pixel stream from said video data stored on said first storage means and said graphics data stored on said at least one additional storage means, wherein said graphics data and said video data represent images stored at equivalent spatial resolutions;

(E) means for generating data transfer addresses of different types for each of said storage means contemporaneously; and (F) means, coupled to said graphics controller, for generating an analog signal representative of said merged pixel stream.

8. An apparatus for integrating a graphics subsystem display buffer with a video subsystem display buffer comprising:

(A) first storage means for storing a first bit plane of video data in a first format;

(B) a graphics controller coupled to said first storage means by a data bus and a storage bus;

(C) means for receiving at least one additional storage means for storing at least one additional bit plane of graphics data in at least one additional format different from said first format, each of said at least one additional storage means being coupled to said graphics controller by a data bus and a storage bus;

(D) means for forming a merged pixel stream from said video data stored on said first storage means and said graphics data stored on said at least one additional storage means, wherein said graphics data and said video data represent images stored at equivalent spatial resolutions;

(E) means for generating data transfer addresses of different types for each of said storage means sequentially; and (F) means, coupled to said graphics controller, for generating an analog signal representative of said merged pixel stream.

9. An apparatus for integrating a graphics subsystem display buffer with a video subsystem display buffer comprising:

(A) first storage means for storing a first bit plane of video data in a first format;

(B) a graphics controller coupled to said first storage means by a data bus and a storage bus;

(C) means for receiving at least one additional storage means for storing at least one additional bit plane of graphics data in at least one additional format different from said first format, each of said at least one additional storage means being coupled to said graphics controller by a data bus and a storage bus;

(D) means for forming a merged pixel stream from said video data stored on said first storage means and said graphics data stored on said at least one additional storage means, wherein said graphics data and said video data represent images stored at equivalent spatial resolutions;

(E) means for generating data transfer addresses of different types for each of said storage means in overlapping time relationship; and (F) means, coupled to said graphics controller, for generating an analog signal representative of said merged pixel stream.

* * * * *